Figure 1:
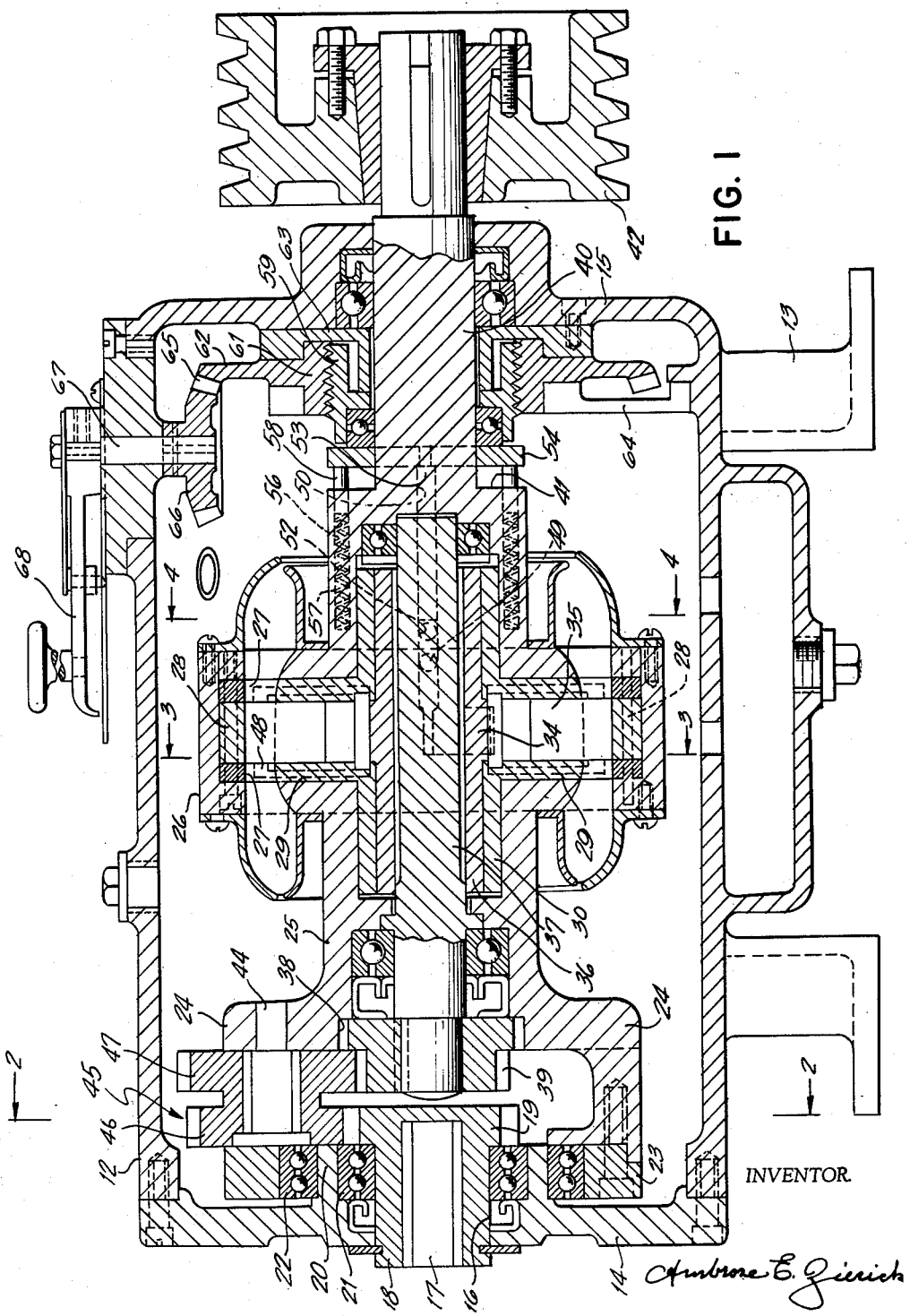

Dec. 1, 1964  A. E. ZIERICK  3,159,058
STATIONARY HYDRAULIC TRANSMISSION
Filed Dec. 14, 1962  3 Sheets-Sheet 1

INVENTOR.
Ambrose E. Zierick

INVENTOR
Ambrose E. Zierick

INVENTOR.
Ambrose E. Zierick

United States Patent Office 3,159,058
Patented Dec. 1, 1964

3,159,058
STATIONARY HYDRAULIC TRANSMISSION
Ambrose E. Zierick, New York, N.Y.
(5700 Arlington Ave., Riverdale, N.Y.)
Filed Dec. 14, 1962, Ser. No. 244,725
11 Claims. (Cl. 74—794)

The present invention relates to a variable hydraulic transmission, particularly adapted for use with constant-speed motors, and especially to a hydraulic transmission which combines a planetary gear system with a hydraulic clutch, and is a continuation in part of my copending application, Serial No. 38,873, filed June 27, 1960, now abandoned.

It is a primary object of the present invention to provide a hydraulic transmission, of the character described, which may be fixed in stationary position.

It is another object of the present invention to provide a stationary variable hydraulic transmission, of the character described, which may be conveniently and easily controlled for speed variation from the exterior thereof.

It is a further object of the present invention to provide a variable hydraulic transmission, of the character described, which may be advantageously used with and applied to the driving of relatively heavy equipment, as automotive, tractor, earth-moving, machine tools, textile machinery, conveyors, and prime marine power installations.

It is a still further object of the present invention to provide a variable hydraulic transmission, of the character described, which is of relatively compact, simple, and sturdy construction, and affords great accuracy and flexibility in speed variation.

The foregoing and other objects and advantages of the variable hydraulic transmission of the present invention will become more readily apparent to those skilled in the art from the embodiment thereof shown in the accompanying drawings, and from the description thereof. It is to be understood, however, that such embodiment is shown by way of illustration only, to make the principles and practice of the invention more readily comprehensible, and without any intent of limiting the invention to the specific details therein shown.

Figure 2:
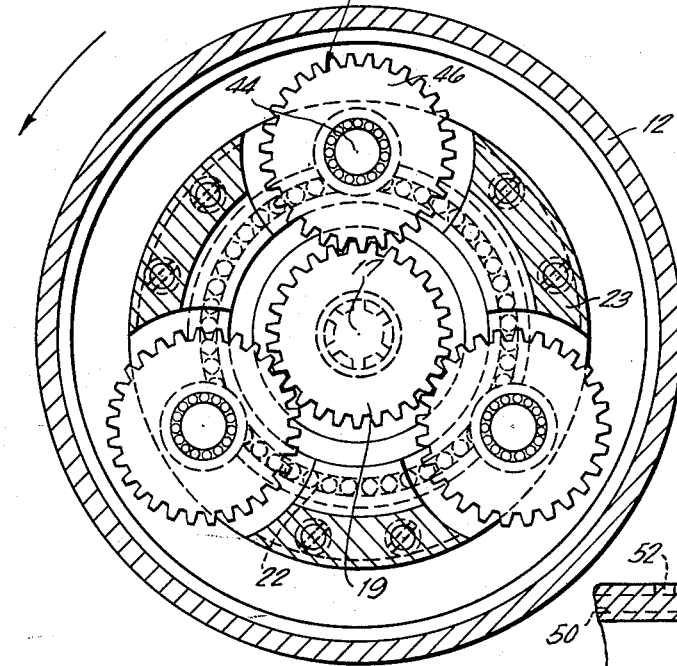
Figure 7:
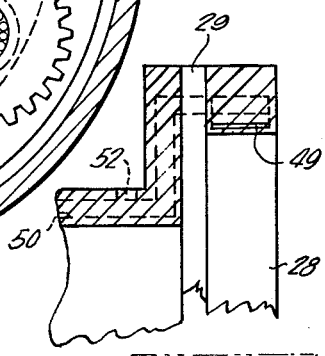
Figure 5:
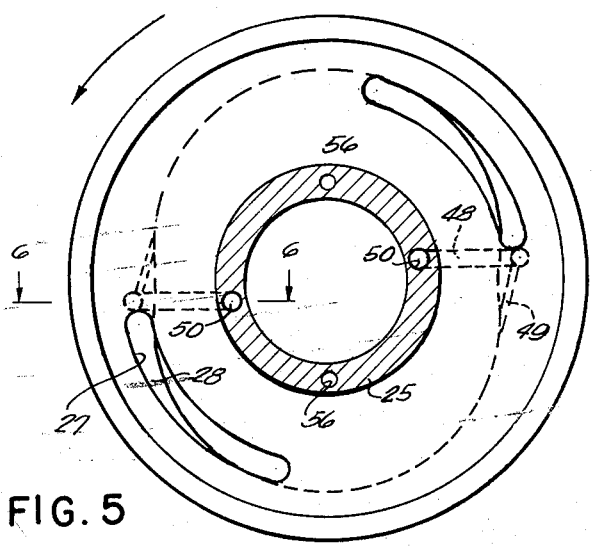
Figure 6:
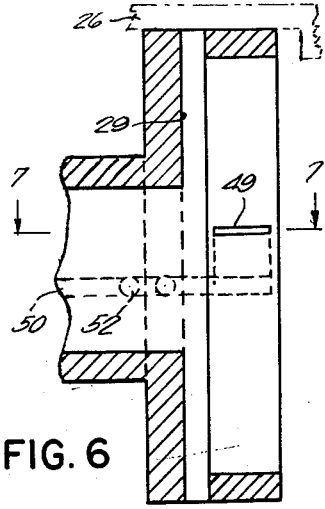
Figure 3:
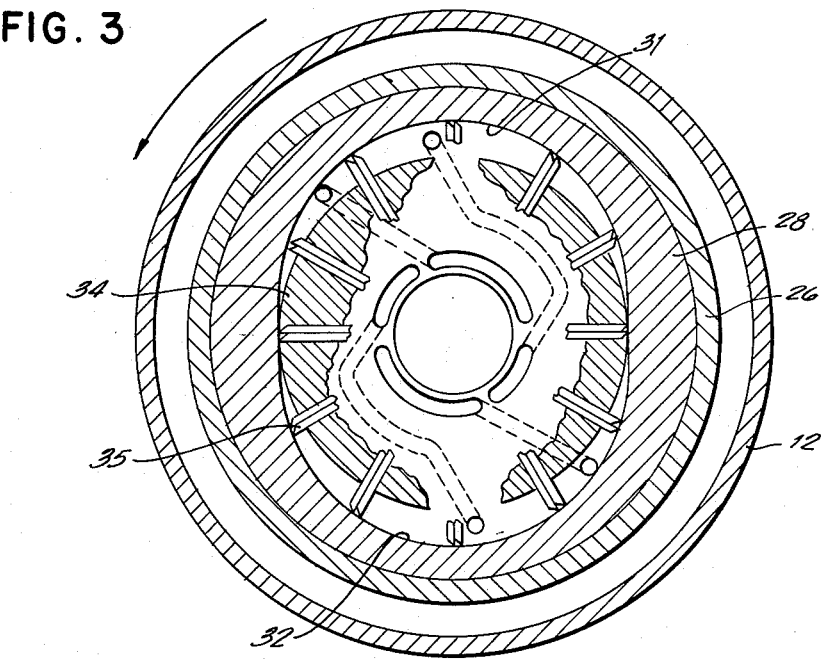
Figure 4:
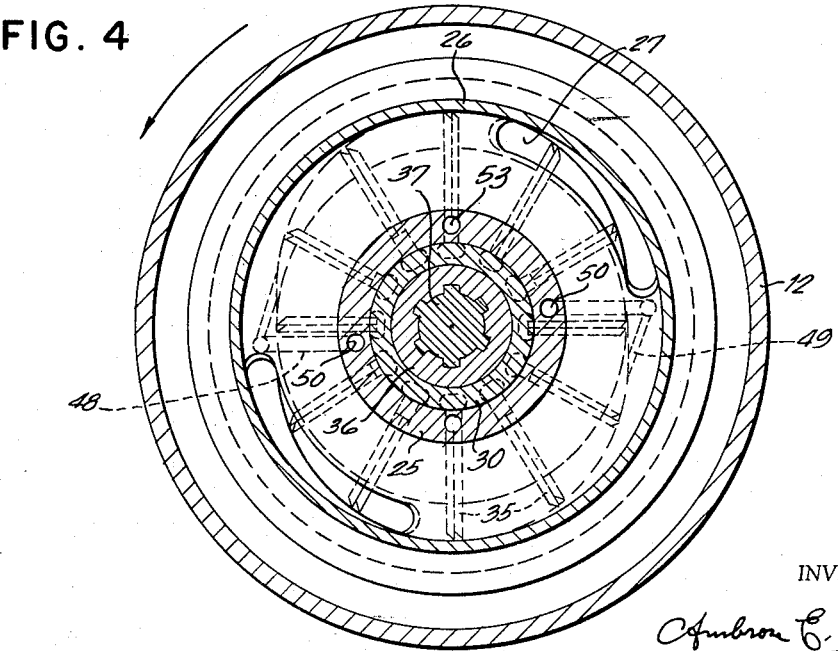

In the drawings:

FIG. 1 is a longitudinal, sectional, and partly elevational view through a hydraulic transmission of my invention taken on line 1—1 of FIG. 2;

FIG. 2 is a cross-section taken on line 2—2 of FIG. 1;
FIG. 3 is a cross-section taken on line 3—3 of FIG. 1;
FIG. 4 is a cross-section taken on line 4—4 of FIG. 1;
FIG. 6 is a section taken on line 5—5 of FIG. 1;
FIG. 6 is a section taken on line 6—6 of FIG. 5; and
FIG. 7 is a section taken on line 7—7 of FIG. 6.

The accompanying drawings illustrate a preferred embodiment of the hydraulic transmission of the invention, in which a preferably cylindrical liquid-tight housing, generally designated as 12, is provided with feet 13, by which is may be supported upon and secured to a desired surface. The housing 12 is formed with end walls 14 and 15, respectively. One of the end walls, as 14, is formed with the axial opening 16, through which extends a short end portion of a driving shaft 17, that is connected to a motor (not shown). A sleeve 18 is splined on the driving shaft end 17 and carries, preferably intergrally, on its inner end, disposed within the housing 12, a pinion, 19. The opening 16 is surrounded on the interior of the housing 12 with a concentric cylindrical flange 20, between which and the sleeve 18 may be disposed a bearing 21, that is fitted around the sleeve 18, between the inner face of wall 14 and the adjacent side of the pinion 19. The flange 20 is surrounded by a bearing 22, that supports a spider 23, to which is secured the annular flange 24, of a cylinder 25, on which is secured the outer ring or housing 26 of a fluid clutch pump which may be of generally conventional, sliding vane type, such as is illustrated in my Patent No. 3,058,- 557, of October 16, 1962; the housing 26 of which may be provided with a pair of symmetrically-arranged inlet openings 27. The pump includes a cam ring 28, which is secured to the outer ring or pump housing 26 and is provided with side walls 29, that terminate in oppositely-extending bearing sleeves 30, that fit within the recess of the cylinder 25. The cam ring 28 and side walls 29 form a housing with pressure chambers 31 and 32 for the rotor 34, that carries the sliding vanes 35, and has a cylindrical hub 36, that fits rotatably within the sleeve 30 concentrically with the cam ring 28 and is splined to a shaft 37, that extends into the recess of the cylinder 25 and projects therefrom into an end enlargement 38 of such recess and supports on its projecting end a pinion 39. The cylinder 25 is closed at its end adjacent wall 15 and is provided at that end with an integral driven shaft portion 40 of relatively reduced diameter to form a shoulder 41; the driven shaft portion 40 extending through an opening in wall 15 and carrying on its projecting end a pulley wheel 42.

The flange 24 of cylinder 25 supports a plurality of spindles 44, that project in the direction of wall 14 on each of which is rotatably supported a twin satellite gear, each generally designated as 45, and each having, preferably, a portion 46 of relatively lesser diameter that meshes with the pinion 19 of the driving shaft 17 and a portion of relatively larger diameter 47, that meshes with the pinion 39 carried on the projecting end of rotor shaft 37.

Each of pressure chambers 31 and 32 is provided with a fluid outlet passage 48, formed in walls 29, that lead to a port 49, opening into a duct or recess 50, formed in the wall of cylinder 25 and leading inwardly thereinto from its shoulder 41. A second or outlet port 52 is provided in each recess 50, preferably outwardly of port 49, which forms an opening of a passageway leading to the exterior of the clutch pump into the housing 12.

A plunger 53 is snugly and slidably disposed in each of the recesses 50 for reciprocal movement therein, to wholly or partly open and close the outlet port 52 thereof. The plungers 53 project from the recesses 50 and engage in a ring 54 that is rotatably and slidably supported on the reduced extension 40 of the cylinder 25, within the housing 12 and which rotates with the cylinder 25, and the plungers 53. The ring 54 and plungers 53 are so arranged that gradual movement of the ring 54 in the direction of the cylinder shoulder 41 will move the plungers 53 to gradually close the ports 52, to thereby gradually break fluid communication between the interior of the clutch pump through port 49 with the housing 12, whereas gradual movement of the ring 54 away from cylinder 25 will move plungers 53 to gradually open ports 52 and re-open communication between the interior and exterior of the clutch pump.

Means are provided for normally maintaining the ring 54 in port-opening position. Such means includes other, axially-extending recesses 56, formed in the wall of cylinder 25 and opening in its shoulder 41 adjacent wall 15. The inner portions of recesses 56 carry expansion coil springs 57, and their outer portions house the ends of partly projecting pins 58, that are kept in constant abutment with the ring 54 by the coil springs 57, tending to normally maintain it in port-opening position.

Means are provided for controlling the degree of opening of the outlet or bleeder ports 52. Such means may comprise an externally, preferably multiple, as triplethreaded sleeve 59, slidably supported on the reduced end 40 of cylinder 25, within housing 12, whose threads mesh with corresponding threads on the internal opening of the hub 61, of a gear ring 62, that is rotatably captive within the housing 12, as between rings 63 and 64 fixed, respectively, on wall 15 and the bottom of the stationary housing 12. The teeth 65 of the captive ring 62 are preferably bevelled and mesh with the teeth of a bevel gear 66 mounted on a shaft 67, that is journalled in the wall of the housing 12 and projects therethrough and carries on its projecting end a handle 68, that may be rotated to rotate the captive ring 62 and thereby rotate and slide the sleeve 59 in either inward or outward direction over the driven shaft section 40.

It will be apparent that when handle 68 is turned in one direction, the bevel gear 66 will turn the captive ring 62 to move the threaded sleeve 59 against the ring 54, to move it inwardly so that its plungers 53 will partially or wholly close the ports 52, depending on the angle through which the handle 68 is rotated. Conversely, when the handle 68 is rotated in the opposite direction, the threaded sleeve 59 will be moved outwardly, towards the wall 15, and away from ring 54, so that the latter is outwardly moved by the pressure of springs 57, to withdraw the plungers 53 and partly or fully open ports 52, to permit partial or full bleeding therethrough, depending on the degree of rotation of the handle 68 in the last-named direction.

It will also be apparent that when ports 52 are opened, by the rotation of the handle 68, in the appropriate direction, the pressure inside of the clutch pump is reduced due to the relative free flow of fluid therein, so that the rotation of the clutch pump is slowed down relative to the rotation of the driving shaft 17. However, when the pressure is at maximum; namely, when the flow of fluid through the clutch pump is inhibited by the closing of ports 52, the clutch cam and housing will turn at substantially the same speed as the rotor 34 and rotor shaft 37 upon which it is splined. The latter, in turn, will rotate at the speed of the driving shaft 17 when the pressure is a maximum, but faster than the shaft 17 when the satellite gears 45 rotate in place without rotation around flange 20.

This completes the description of one embodiment of the stationary hydraulic transmission of the present invention. It will be readily apparent that numerous variations and modifications may be made in such stationary hydraulic transmission by anyone skilled in the art, in accordance with the principles of the invention hereinabove set forth, without the exercise of any inventive ingenuity. I desire, therefore, to be protected for any and all such variations and modifications that may be made within the spirit of the invention and the scope of the claims hereto appended.

What I claim is:

1. A stationary hydraulic transmission comprising, in combination, a stationary, liquid-tight housing, a driving shaft extending into said housing, the inwardly-projecting shaft of said driving shaft having a pinion connected thereon; a fluid clutch pump within said housing, said pump including a cylinder having a driven shaft connected thereto at one end thereof, said cylinder and said driven shaft in axial alinement with said driving shaft, said driven shaft rotatably supported on said housing; a pump-rotor housing including a cam ring axially mounted on said cylinder for rotation therewith; a rotor including radially-displaceable vanes within said rotor housing, said rotor including a shaft rotatably disposed within said cylinder and extending towards said driving shaft, said rotor shaft having a pinion connected to its end adjacent said driving shaft; planetary gears mounted on said cylinder adjacent said driving shaft, rotatable means concentric with said driving shaft supporting said cylinder end, each of said planetary gears having a section thereof meshing with said driving shaft pinion and a section meshing with said rotor shaft pinion, said fluid clutch pump having a fluid passage provided therein from said rotor housing to said stationary housing, said passage extending through the wall of said cylinder and having an inlet port into said cylinder and an outlet port from said cylinder, means rotatable with said cylinder for adjustably opening and closing one of said passage ports, and means extending through said stationary housing for adjustably moving said port-closing and opening means.

2. The stationary hydraulic transmission of claim 1, wherein said cylinder is formed with an axially-extending recess in its walls, said recess opening into the end face of said wall, and wherein said ports are formed in said recess, and wherein said means for adjustably opening and closing said port comprises a plunger reciprocable within said recess and projecting therefrom, and means rotatable with and slidable axially of said cylinder engaging the projecting end of said plunger.

3. The stationary hydraulic transmission of claim 1, wherein a pair of fluid passages are provided from said rotor housing to said stationary housing, and a pair of recesses extending axially of said cylinder are provided in the wall thereof, each said recess having said ports formed therein, and wherein means are provided for closing a port within each of said recesses, said port-closing means comprising a plunger slidably disposed within said recess and projecting therefrom, and means rotatable with and slidable axially of said cylinder engaging the projecting end of said plunger.

4. The stationary hydraulic transmission of claim 3, wherein said driven shaft is of lesser diameter than said cylinder, and said recesses open into the end face of said cylinder at the base of said driven shaft, and the means engaging the projecting end of said plungers comprises a ring rotatably and slidably mounted over said driven shaft.

5. The stationary hydraulic transmission of claim 3, wherein said cylinder is formed with a portion of reduced cross-section at its end adjacent said driven shaft, said recesses opening into the face of said cylinder surrounding said reduced portion, and wherein the means for engaging the projecting end of said plungers comprises a ring rotatably and slidably mounted over said reduced portion of said cylinder.

6. The stationary hydraulic transmission of claim 3, wherein said driven shaft is of lesser diameter than said cylinder, and said recesses open into the end face of said cylinder at the base of said driven shaft, and the means engaging the projecting end of said plungers comprises a ring rotatably and slidably mounted over said driven shaft, and wherein resilient means are provided for automatically moving said ring into one position of said plungers relative to said port and said means extending through said stationary housing wall are provided for moving said ring into the other position of said plungers relative to said ports.

7. The stationary hydraulic transmission of claim 3, wherein said driven shaft comprises a co-axial extension of said cylinder, of lesser diameter than said cylinder, and said recesses open into the end face of said cylinder adjacent said driven shaft, and the means engaging the projecting end of said plungers comprises a member rotatably and slidably mounted over said co-axial extension of said cylinder and wherein resilient means are provided for moving the said ring into one position of the said plungers relative to said ports, and wherein said means extending through said stationary housing wall are provided to move said member into the other position of said plungers relative to said ports, said manually-operable means comprising an externally-threaded sleeve slidably supported on said reduced cylinder extension, a gear wheel having an internally-threaded hub in engagement with said externally-threaded sleeve, means retaining said wheel in fixed, rotatable position, a shaft extending through the wall of said housing, said shaft carrying a gear wheel within said housing meshing with said firstnamed gear wheel and engageable on the exterior of said housing for rotation of said second-named gear wheel.

8. The stationary hydraulic transmission of claim 7, wherein said resilient means comprises recesses formed in the wall of said cylinder and opening into said end wall thereof, each said recess housing an expansion coil spring at its inner end and a pin at its other end, said pin projecting therefrom and bearing against said slidable member.

9. The stationary hydraulic transmission of claim 1, wherein said means rotatably supporting said cylinder end comprises an annular flange on the inner face of the wall of said housing concentric with said driving shaft and a spider rotatably supported on said annular flange, said cylinder connected to said spider.

10. The stationary hydraulic transmission of claim 1, wherein the gear ratio between said planetary gears and said rotor shaft pinion is different than the gear ratio between said planetary gears and said driving shaft pinion.

11. The stationary hydraulic transmission of claim 1, wherein the gear ratio between said planetary gears and said rotor shaft pinion is greater than the gear ratio between said planetary gears and said driving shaft pinion.

References Cited in the file of this patent

UNITED STATES PATENTS

| | | |
|---|---|---|
| 1,667,290 | Gayer | Apr. 24, 1928 |
| 1,765,948 | Sheridan | June 24, 1930 |
| 2,932,991 | Zierick | Apr. 19, 1960 |
| 3,058,557 | Zierick | Oct. 16, 1962 |

FOREIGN PATENTS

| | | |
|---|---|---|
| 183,754 | Switzerland | July 16, 1936 |